US012321518B2

(12) United States Patent
Feng

(10) Patent No.: US 12,321,518 B2
(45) Date of Patent: Jun. 3, 2025

(54) METHOD FOR CHANGING DISPLAYED SCENE, INTELLIGENT DISPLAY SCREEN AND READABLE STORAGE MEDIUM

(71) Applicant: SHENZHEN CHUANGWEI-RGB ELECTRONICS CO., LTD., Shenzhen (CN)

(72) Inventor: Peng Feng, Shenzhen (CN)

(73) Assignee: SHENZHEN CHUANGWEI-RGB ELECTRONICS CO., LTD., Shenzhen (CN)

( * ) Notice: Subject to any disclaimer, the term of this patent is extended or adjusted under 35 U.S.C. 154(b) by 259 days.

(21) Appl. No.: 17/916,565

(22) PCT Filed: Nov. 4, 2020

(86) PCT No.: PCT/CN2020/126478
§ 371 (c)(1),
(2) Date: Sep. 30, 2022

(87) PCT Pub. No.: WO2021/196608
PCT Pub. Date: Oct. 7, 2021

(65) Prior Publication Data
US 2023/0152895 A1 May 18, 2023

(30) Foreign Application Priority Data
Apr. 2, 2020 (CN) .......................... 202010261578.8

(51) Int. Cl.
G06F 16/909 (2019.01)
G06F 3/01 (2006.01)
G06F 3/0484 (2022.01)
(52) U.S. Cl.
CPC ............ G06F 3/016 (2013.01); G06F 3/0484 (2013.01); G06F 16/909 (2019.01)

(58) Field of Classification Search
CPC ............................... G06F 3/016; G06F 3/0484
See application file for complete search history.

(56) References Cited

U.S. PATENT DOCUMENTS 9,211,648 B2    12/2015  Grinstead et al.
10,645,532 B1*  5/2020   Kulkarni ............... H04W 4/024
(Continued)

FOREIGN PATENT DOCUMENTS

CN    104731545 A    6/2015
CN    105259765 A    1/2016
(Continued)

OTHER PUBLICATIONS

International search Report from Appl. No .: PCT/CN2020/126478, mailed on Nov. 4, 2020.
(Continued)

Primary Examiner — Kris E Mackes
(74) Attorney, Agent, or Firm — Nevrivy Patent Law Group P.L.L.C.

(57) ABSTRACT

Disclosed are method for changing displayed scene, intelligent display screen and readable storage medium. The method includes: determining (201) a plurality of candidate signal transmitting devices and a distance between each candidate signal transmitting device and the intelligent display screen based on a plurality of received signals; determining (202) a target signal transmitting device closest to the intelligent display screen from a plurality of candidate signal transmitting devices and a target area to which the target signal transmitting device belongs; and determining (203) a target scene corresponding to the target area in a layout diagram displayed by the intelligent display screen and changing the displayed scene of the intelligent display screen to the target scene. Therefore, a displayed scene of the intelligent display screen can be automatically changed in real time, and the efficiency and effectiveness of changing (Continued)

the displayed scene of the intelligent display screen can be improved.

9 Claims, 3 Drawing Sheets

(56) References Cited

U.S. PATENT DOCUMENTS

| | | | |
|---|---|---|---|
| 10,817,124 B2* | 10/2020 | Kelso | G06F 3/03545 |
| 2007/0126552 A1 | 6/2007 | Fitzgibbon | |
| 2013/0339383 A1* | 12/2013 | Song | G06F 16/9537 |
| | | | 707/769 |
| 2016/0094940 A1* | 3/2016 | Vigier | H04W 4/02 |
| | | | 455/456.3 |
| 2017/0041566 A1* | 2/2017 | He | H04N 13/398 |
| 2018/0135991 A1* | 5/2018 | Yang | H04L 67/52 |
| 2018/0137699 A1* | 5/2018 | Yang | G07C 9/00 |
| 2020/0026394 A1* | 1/2020 | Rodolico | G01S 13/08 |
| 2022/0128710 A1* | 4/2022 | Tzirimis | G01S 19/48 |

FOREIGN PATENT DOCUMENTS

| | | |
|---|---|---|
| CN | 106961597 A | 7/2017 |
| CN | 11413904 A | 7/2020 |

OTHER PUBLICATIONS

English translation of International search Report from Appl. No. PCT/CN2020/126478, mailed on Nov. 4, 2020.

* cited by examiner

METHOD FOR CHANGING DISPLAYED SCENE, INTELLIGENT DISPLAY SCREEN AND READABLE STORAGE MEDIUM

CROSS-REFERENCE TO RELATED APPLICATIONS

The present application claims the priority of the Chinese patent application No. 2020102615788, entitled "method for changing displayed scene, intelligent display screen and readable storage medium" filed on Apr. 4, 2020, which is explicitly incorporated herein by reference in its entirety.

FIELD

The present application relates to the technical field of intelligent display, and in particular, to a method for changing a displayed scene, an intelligent display screen and a readable storage medium.

BACKGROUND

With the rapid development of computer technologies, an intelligent display device is more widely used in various scenes to display a specific scene and interact with a user. During the display of an intelligent display device, scene changing may be involved, so as to more accurately carry out a display function.

At the present stage, the scene changing of an intelligent display device is more dependent on changing instructions. After receiving the changing instructions from a background server or a user, the scene changing is carried out. This method depends on the changing mode of the changing instructions. During the movement of a user, the real-time position of the user has hysteresis relative to the real-time position of the user, the effectiveness of scene changing is poor, and the changing efficiency is low.

SUMMARY

In view of this, one of the objectives of the present application is to provide a method for changing a displayed scene, an intelligent display screen, and a readable storage medium. By determining a target area to which the target device belongs, determining the current position of the intelligent display screen, and changing the displayed scene to the target scene corresponding to the target area automatically, the displayed scene of the intelligent display screen can be automatically changed in real time, which thereby improves the efficiency and effectiveness of changing the displayed scene of the intelligent display screen.

An example of the present application provides a method for changing a displayed scene applied to an intelligent display screen, comprising:
  determining a plurality of candidate signal transmitting devices and a distance between each candidate signal transmitting device and the intelligent display screen based on a plurality of received received signals;
  determining a target signal transmitting device closest to the intelligent display screen from a plurality of candidate signal transmitting devices and a target area to which the target signal transmitting device belongs; and
  determining a target scene corresponding to the target area in a layout diagram displayed by the intelligent display screen and changing a displayed scene of the intelligent display screen to the target scene.

In an alternative embodiment, the candidate signal transmitting device is determined by the following steps:
  determining an identification information of a signal transmitting device corresponding to each received received signal, and detecting whether the corresponding signal transmitting device belongs to a position identification device based on the identification information of each signal transmitting device; and
  determining the signal transmitting device belonging to the position identification device as the candidate signal transmitting device.

In an alternative embodiment, the target area to which the target signal transmitting device belongs is determined by the following steps:
  determining a coordinate position of the target signal transmitting device in an indoor coordinate system from a preset signal transmitting device list based on the identification information of the target signal transmitting device;
  determining a division area taking the coordinate position as a circle center and taking a preset length as a radius; and
  determining the division area as the target area to which the target signal transmitting device belongs in the indoor coordinate system.

In an alternative embodiment, the target scene corresponding to the target area in the layout diagram of the intelligent display screen is determined by the following steps:
  determining at least one preset position node in the target area based on the coordinate position and a plurality of coordinate positions in the indoor coordinate system in the target area;
  determining the target scene based on a mapping relationship between each preset position node and a scene in the layout diagram.

In an alternative embodiment, after determining the target scene corresponding to the target area in the layout diagram displayed by the intelligent display screen, and changing the displayed scene of the intelligent display screen to the target scene, the switching method further comprises:
  determining a device recommendation information corresponding to the target scene; and
  determining a plurality of intelligent devices in the target scene based on the device recommendation information, and displaying each intelligent device and corresponding work information on the intelligent display screen;
  determining work information selected by a user based on received control instruction of the user, and controlling the corresponding intelligent device to work.

In an alternative embodiment, the determining a plurality of candidate signal transmitting devices and a distance between each candidate signal transmitting device and the intelligent display screen based on a plurality of received received signals comprises:
  determining a candidate signal transmitting device emitting each received signal based on the received received signal; and
  determining a distance between each candidate signal transmitting device and the intelligent display screen receiving the received signal.

In an alternative embodiment, the determining a distance between each candidate signal transmitting device and the intelligent display screen receiving the received signal comprises:

determining a strength of the received signal; and determining a distance between each candidate signal transmitting device and the intelligent display screen receiving the received signal based on the strength of the received signal.

In an alternative embodiment, the determining a distance between each candidate signal transmitting device and the intelligent display screen receiving the received signal comprise:

sending a signal instruction to a first candidate signal transmitting device at a receiving time point of the received signal, wherein the first candidate signal transmitting device is any one of a plurality of candidate signal transmitting devices; and determining a distance between the first candidate signal transmitting device and the intelligent display screen receiving the received signal by receiving a time of the feedback signal fed back by the first candidate signal transmitting device.

An example of the present application further provides an intelligent display screen, comprises:

a device determining module, configured to determine a plurality of candidate signal transmitting devices and a distance between each candidate signal transmitting device and the intelligent display screen based on a plurality of received received signals;

an area determining module, configured to determine a target signal transmitting device closest to the intelligent display screen from a plurality of candidate signal transmitting devices and a target area to which the target signal transmitting device belongs; and a scene changing module, configured to determine a target scene corresponding to the target area in a layout diagram displayed by the intelligent display screen, and change a displayed scene of the intelligent display screen to the target scene.

In an alternative embodiment, the device determining module is configured to determine the candidate signal transmitting device by the following steps:

determining an identification information of a signal transmitting device corresponding to each received received signal, and detecting whether the corresponding signal transmitting device belongs to a position identification device based on the identification information of each signal transmitting device;

determining the signal transmitting device belonging to the position identification device as a candidate signal transmitting device.

In an alternative embodiment, the area determining module is configured to determine a target area to which the target signal transmitting device belongs by the following steps:

determining a coordinate position of the target signal transmitting device in an indoor coordinate system from a preset signal transmitting device list based on the identification information of the target signal transmitting device;

determining a division area taking the coordinate position as a circle center and taking a preset length as a radius; and determining the division area as the target area to which the target signal transmitting device belongs in the indoor coordinate system.

In an alternative embodiment, the scene changing module is configured to determine the target scene corresponding to the target area in the layout diagram of the intelligent display screen by the following steps:

determining at least one preset position node in the target area based on the coordinate position and a plurality of coordinate positions in the indoor coordinate system in the target area; and determining the target scene based on a mapping relationship between each preset position node and a scene in the layout diagram.

In an alternative embodiment, the intelligent display screen further comprises a device recommendation module, and the device recommendation module is configured to:

determine a device recommendation information corresponding to the target scene;

determine a plurality of intelligent devices in the target scene based on the device recommendation information, and display each intelligent device and the corresponding work information on the intelligent display screen; and determine a work information selected by a user based on the received control instruction of the user, and control the corresponding intelligent device to work.

An example of the present application further provides an electronic device, comprising a processor, a memory and a bus, wherein the memory stores machine-readable instructions executable by the processor, and when the electronic device runs, the processor communicates with the memory through the bus, and when the machine-readable instructions are executed by the processor, the method for changing a displayed scene described above is carried out.

An example of the present application further provides a computer-readable storage medium, wherein a computer program is stored on the computer-readable storage medium, and when the computer program is run by a processor, the method for changing a displayed scene described above is carried out.

According to the method for changing a displayed scene, an intelligent display screen and a readable storage medium provided in the examples of the present application, a plurality of candidate signal transmitting devices and a distance between each candidate signal transmitting device and the intelligent display screen are determined based on a plurality of received received signals, a target signal transmitting device closest to the intelligent display screen from a plurality of candidate signal transmitting devices and a target area to which the target signal transmitting device belongs are determined; and a target scene corresponding to the target area in a layout diagram displayed by the intelligent display screen is determined, and the displayed scene of the intelligent display screen is changed to the target scene.

Compared with the method for changing a scene in the prior art, the target signal transmitting device closest to the intelligent display screen is determined from a plurality of candidate signal transmitting devices through a plurality of received receiving devices, and the corresponding target scene in the layout map is determined based on the target area to which the target signal transmitting device belongs. Therefore, the displayed scene of the intelligent display screen can be automatically changed to the target scene in real time, and the efficiency and effectiveness of changing the displayed scene of the intelligent display screen can be improved.

In order to make the above objects, features and advantages of the present application more comprehensible, several embodiments accompanied with drawing are described in detail below.

BRIEF DESCRIPTION OF THE DRAWINGS

To describe the technical solutions of the examples of the present application more clearly, the following briefly introduces the accompanying drawings required for describing the examples. It should be understood that the following drawings merely show some examples of the present application, and therefore should not be considered as limiting the scope. One skilled in the art, can obtain other related drawings according to these accompanying drawings without inventive efforts.

DETAILED DESCRIPTION

Figure 1:
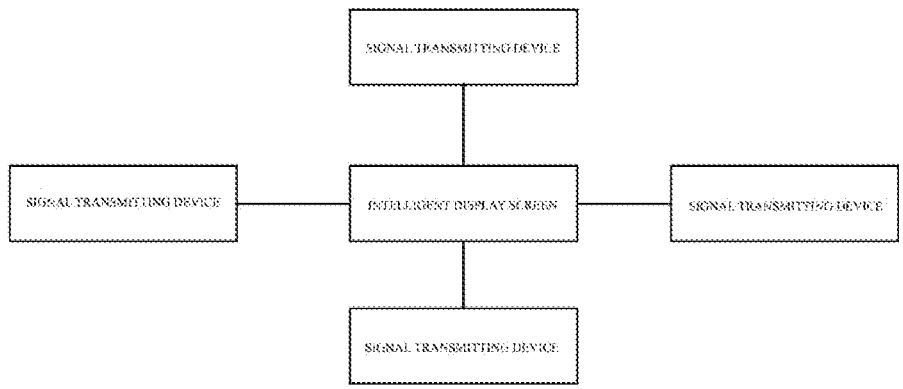
FIG. 1 is a structural diagram of a system in a possible application scene.

To make the objectives, technical solutions, and advantages of the examples of the present disclosure clearer, the following clearly and completely describes the technical solutions in the examples of the present disclosure with reference to the accompanying drawings in the examples of the present disclosure. Apparently, the described examples are merely some but not all of the examples of the present disclosure. The components in the examples of the present application, which are generally described and illustrated in the drawings herein, may be arranged and designed in a variety of different configurations. Therefore, the following detailed description of the examples of the present disclosure provided in the accompanying drawings is not intended to limit the scope of the present disclosure, but merely represents selected examples of the present disclosure. Based on the examples of the present disclosure, every other example obtained by one skilled in the art without inventive efforts shall fall within the protection scope of the present disclosure.

First, an application scene applicable to the present disclosure is introduced. The present disclosure can be applied to the technical field of intelligent display. A target signal transmitting device closest to the intelligent display screen is determined from a plurality of candidate signal transmitting devices by a plurality of receiving devices, and a corresponding target scene in a layout diagram is determined based on a target area to which the target signal transmitting device belongs, so that the displayed scene of the intelligent display screen is changed to the target scene, and the displayed scene of the intelligent display screen can be automatically changed in real time, and the efficiency and effectiveness of changing the displayed scene of the intelligent display screen can be improved. Referring to FIG. 1, FIG. 1 is a structural diagram of a system in a possible application scene. As shown in FIG. 1, the system includes an intelligent display screen and a plurality of signal transmitting devices. The intelligent display screen receives a received signal of each signal transmitting device, and determines a target signal transmitting device closest to the intelligent display screen based on a device identifier and a received signal of each signal transmitting device. Based on a target scene corresponding to a target area to which the target signal transmitting device belongs, the intelligent display screen changes the display interface to the target scene.

It has been found that at the present stage, the scene changing of an intelligent display device is more dependent on changing instructions. After receiving the changing instructions from the background server or a user, the scene changing is performed. This method depends on the changing mode of the changing instructions. During movement of a user, the real-time position of the user has hysteresis relative to the real-time position of the user, the effectiveness of scene changing is poor, and the changing efficiency is low.

Based on the above, the examples of the present disclosure provide a method for changing a displayed scene, which can automatically change the displayed scene of the intelligent display screen in real time, which helps to improve the efficiency and effectiveness of changing the displayed scene of the intelligent display screen.

Figure 2:
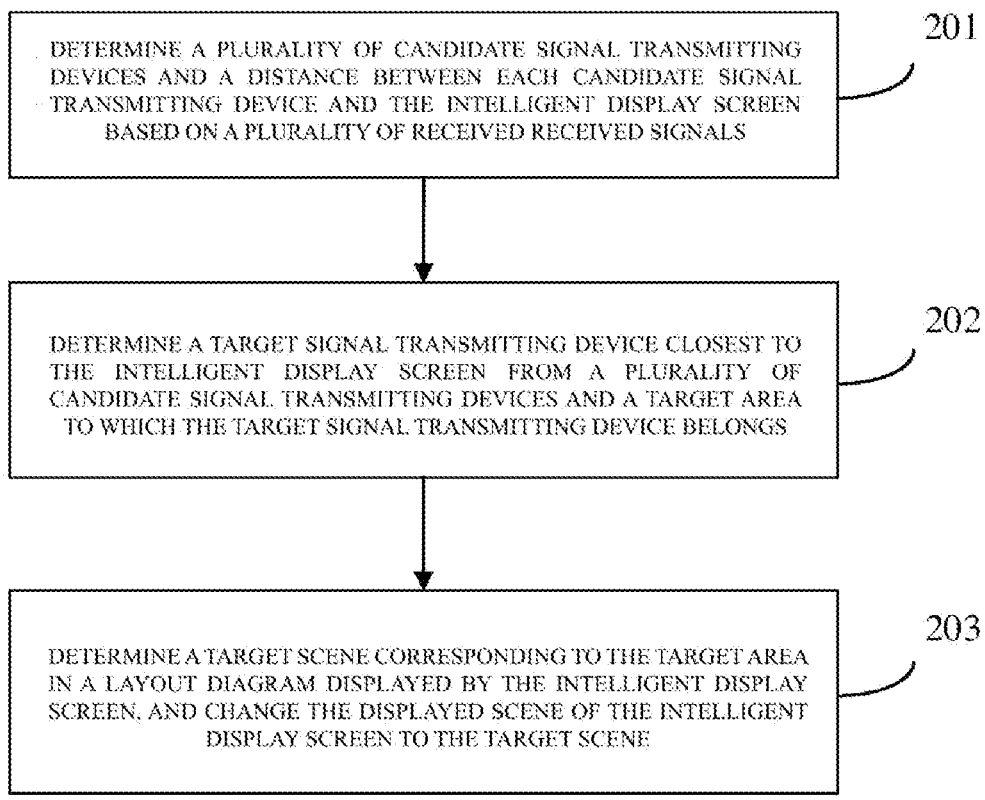
FIG. 2 is a flowchart of a method for changing a displayed scene according to an example of the present disclosure.

Referring to FIG. 2, FIG. 2 is a flowchart of a method for changing a displayed scene according to an example of the present disclosure. As shown in FIG. 2, a method for changing a displayed scene according to an example of the present disclosure comprises:

Step 201: determining a plurality of candidate signal transmitting devices and a distance between each candidate signal transmitting device and the intelligent display screen based on a plurality of received received signals.

In this step, the candidate signal transmitting device sending each received signal is determined according to the received received signal, and the distance between each candidate signal transmitting device and the intelligent display screen receiving the received signal is determined.

Here, the signal transmitting device may be a Bluetooth module, which may be mounted on an indoor device, or may be a device having a Bluetooth module function in the multiplexing chamber and having a fixed placement position, which may be a Bluetooth box, intelligent socket, intelligent furniture, and the like.

Here, the signal receiving module in the intelligent display screen may receive the signals sent by all the devices. In order to accurately complete the positioning, the received signals need to be screened before each candidate signal transmitting device is determined.

Here, after the signal receiving module in the intelligent display screen receives the received signal, the identification information of the candidate signal transmitting device corresponding to each received signal and the strength of the received signal are determined, so that the distance between each candidate signal transmitting device and the intelligent display screen is determined according to the strength of the received received signal. The stronger the received signal is, the closer the corresponding candidate signal transmitting device is to the intelligent display screen.

Here, in addition to determining the distance between each candidate signal transmitting device and the intelligent display screen according to the strength of the received received signal, a unified receiving time of received signal is set according to requirements, and at the receiving time point of the received signal, a signal instruction is sent to each candidate signal transmitting device. Before the time of receiving the feedback signal fed back by each candidate signal transmitting device, the distance between each candidate signal transmitting device and the intelligent display screen is determined. The closer the time the feedback signal is received, the closer the corresponding candidate signal transmitting device is to the intelligent display screen. For example, at the receiving time point of the received signal, the intelligent display screen sends a signal instruction to the first candidate signal transmitting device; the first candidate signal transmitting device is any one of a plurality of candidate signal transmitting devices; and the distance between the first candidate signal transmitting device and the intelligent display screen receiving the received signal is determined by receiving the feedback signal fed back by the first candidate signal transmitting device.

Step 202: determining a target signal transmitting device closest to the intelligent display screen from a plurality of candidate signal transmitting devices and a target area to which the target signal transmitting device belongs.

In this step, the target signal transmitting device closest to the intelligent display screen is screened out according to a plurality of candidate signal transmitting devices determined in step 201 and the distance between each signal transmitting device and the intelligent display screen, and the target area to which the target signal transmitting device belongs in the indoor real scene is determined.

Here, for the distance between the candidate signal transmitting device and the intelligent display screen determined according to the strength of the received signal, the distance between the at least two candidate signal transmitting devices and the intelligent display screen may be close. In this case, the distance between the at least two candidate signal transmitting devices and the intelligent display screen may be determined simultaneously. Before receiving the feedback signal fed back by each candidate signal transmitting device, the distance between each candidate signal transmitting device and the intelligent display screen is determined. The closer the time the feedback signal is received, the closer the corresponding candidate signal transmitting device is to the intelligent display screen.

Here, the target area to which the target signal transmitting device belongs may refer to a coordinate position in a preset indoor coordinate.

Step 203: determining a target scene corresponding to the target area in a layout diagram displayed by the intelligent display screen, and changing the displayed scene of the intelligent display screen to the target scene.

In this step, a target scene corresponding to the target area determined in step 202 is determined, and the intelligent display screen is controlled to change the displayed picture from the current displayed scene to the target scene.

Here, a scene displayed in the intelligent display screen is generated according to an actual placement position of each of a plurality of actual scenes to be displayed by the intelligent display screen when the intelligent display screen is used for the first time.

For example, if the scene displayed by the intelligent display screen is an indoor scene of the user, when the intelligent display screen is used for the first time, the living room, the kitchen, the bedroom, the toilet and other locations in the user's home are bound in the storage module of the intelligent display screen correspondingly, and the facilities contained in the kitchen, the bedroom, the toilet and other locations need to be determined. The controls corresponding to each facility are arranged at the corresponding positions according to the corresponding proportions, so as to determine a plurality of displayed scenes in the user's home, in which one position may be one displayed scene. In this example, the displayed scenes of the user in the intelligent display screen may include a living room scene, a kitchen scene, a bedroom scene, a bathroom scene, and the like.

Here, when the intelligent display screen is used for the first time, not only a scene and a facility in the user's home should be arranged proportionally, but a virtual node corresponding to the signal transmitting device disposed in each displayed scene needs to be bound to the virtual node in each displayed scene. When the signal transmitting device and the virtual node are bound and removed, and a device is added, the virtual node should also be placed in the displayed scene layout with reference to the actual planar control position.

When each signal transmitting device is bound to the virtual node, the unique identifier of each signal transmitting device may be bound to each virtual node, and the unique identifier may use the model number of the signal transmitting device or the number of each signal transmitting device given by an engineer before setting. For example, the number corresponding to the signal transmitting device disposed on the television in the living room may be "KT-TV-01".

According to the method for changing a displayed scene provided in this example of the present disclosure, a plurality of candidate signal transmitting devices and a distance between each candidate signal transmitting device and the intelligent display screen are determined based on a plurality of received received signals. A target signal transmitting device closest to the intelligent display screen from the plurality of candidate signal transmitting devices and a target area to which the target signal transmitting device belongs are determined A target scene corresponding to the target area in a layout diagram displayed by the intelligent display screen is determined and the displayed scene of the intelligent display screen is changed to the target scene.

Compared with the method for changing a scene in the prior art, the target signal transmitting device closest to the intelligent display screen is determined from the plurality of candidate signal transmitting devices through the a plurality of received receiving devices, and the corresponding target scene in the layout map is determined based on the target area to which the target signal transmitting device belongs. Therefore, the displayed scene of the intelligent display screen can be automatically changed to the target scene in real time, and the efficiency and effectiveness of changing the displayed scene of the intelligent display screen can be improved.

Figure 3:
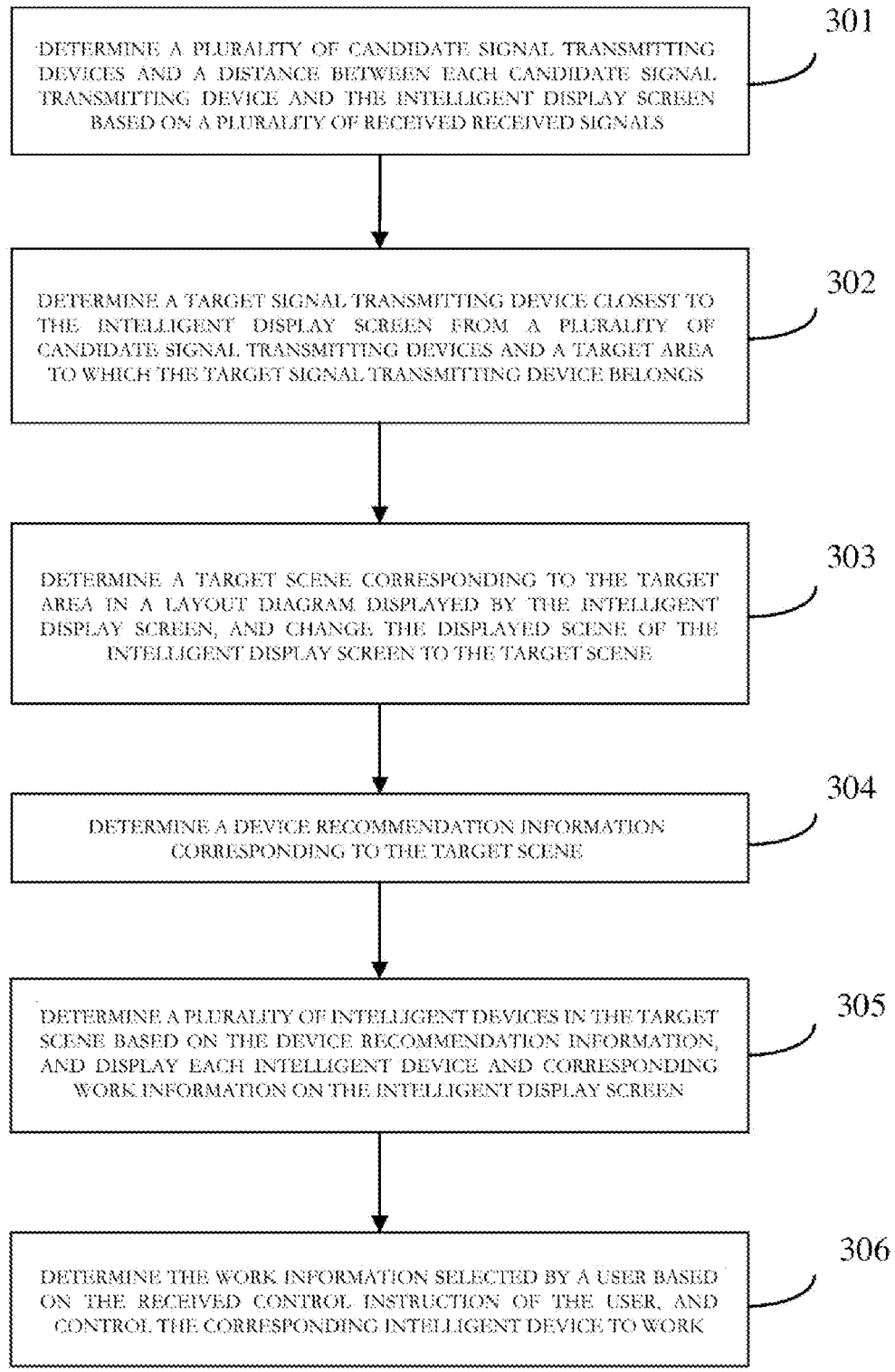
FIG. 3 is a flowchart of a method for changing a displayed scene according to another example of this disclosure.

Referring to FIG. 3, FIG. 3 is a flowchart of a method for changing a displayed scene according to another example of the present disclosure. As shown in FIG. 3, a method for changing a displayed scene according to an example of the present disclosure comprises: Step 301: determining a plurality of candidate signal transmitting devices and a distance between each candidate signal transmitting device and the intelligent display screen based on a plurality of received received signals.

Step 302: determining a target signal transmitting device closest to the intelligent display screen from a plurality of candidate signal transmitting devices and a target area to which the target signal transmitting device belongs.

Step 303: determining a target scene corresponding to the target area in a layout diagram displayed by the intelligent display screen, and changing the displayed scene of the intelligent display screen to the target scene.

Step 304: determining a device recommendation information corresponding to the target scene.

In this step, after the target scene is determined in step 303, the intelligent device in the target scene and the service that can be provided by each intelligent device are determined, that is, the device recommendation information in the target scene is determined.

Herein, for the device recommendation information, when the intelligent display screen is used for the first time, according to the facilities included in each scene, the device recommendation information not only includes a device that can provide service in the target scene, but includes a service type of a plurality of services that can be provided by the device, and a plurality of selection modes under each service type.

For example, in a kitchen scene, a service type that may be provided may include turning on a lamp in a kitchen, controlling the temperature of an intelligent refrigerator in the kitchen, opening a range hood related to cooking, a intelligent socket and the like. In this type of opening the lamplight in the kitchen, a plurality of selection modes such as turning off the main lamp, turning on the small lamp, opening the lamp on the sorting table and the like can be included.

Here, the device recommendation information corresponding to the target scene needs to be updated periodically, or after a new device is added to the corresponding scene, the device recommendation information is updated in real time.

Step 305: determining a plurality of intelligent devices in the target scene based on the device recommendation information, and displaying each intelligent device and corresponding work information on the intelligent display screen.

In this step, according to the device recommendation information determined in step 304, a plurality of intelligent devices that can provide service in the target scene are determined, and each intelligent device and the corresponding work information are displayed on the intelligent display screen.

Here, for the intelligent device in the target scene, when the intelligent display screen is changed to the target scene, the corresponding service cannot be provided when the intelligent display screen is changed to the target scene. Therefore, before the work information is displayed, the use state of each intelligent device is determined, and each intelligent device that can normally provide the service and the corresponding work information are displayed on the intelligent display screen.

Here, for each intelligent device and the manner in which the corresponding work information is displayed on the intelligent display screen, a recommendation device display interface may be popped up, and a device information table is displayed on the recommendation device display interface. In the device information table, the name of each intelligent device and the corresponding work information are in one row, and the names of the intelligent devices are in one column. The operation information of the intelligent device may also be displayed at a corresponding intelligent device in the target scene.

Step 306: determining the work information selected by a user based on the received control instruction of the user, and controlling the corresponding intelligent device to work.

In this step, after the operation information is displayed in step 305, the work information selected by the user is identified according to the received control instruction of the user, and the corresponding intelligent device is controlled to work in the mode selected by the user.

Here, for the control instruction for the user, the user touches the intelligent display screen, and determines the work information in the position according to the touch position of the user, so as to determine the work information selected by the user, in which the touch operation of the user may be a click operation, a sliding operation and the like and the click operation is to click at a specified position and the click time exceeds a preset time threshold, and the area coverage area where the sliding operation slides is greater than a preset area threshold, so as to be an effective control operation.

Here, after the user is at the position of the target area, that is, in the target scene, the conventional operation of the user can be determined according to the operation history of the user, and the control instruction of the user does not need to be received, and after the target scene is changed, the intelligent device is controlled to work.

For example, after the user goes home at night, after entering the gateway, when it is detected that the target scene is changed to the switch, the lamp at the gateway is directly controlled to be turned on to provide the lighting service for the user.

For the description of steps 301 to 303, reference can be made to the descriptions of steps 201 to 203, and the same technical effect can be achieved, which will not be repeated here.

In an alternative embodiment, the candidate signal transmitting device is determined by: determining an identification information of a signal transmitting device corresponding to each received received signal, and detecting whether the corresponding signal transmitting device belongs to a position identification device based on the identification information of each signal transmitting device; and determining the signal transmitting device belonging to the position identification device as a candidate signal transmitting device.

In this step, after the intelligent display screen receives a plurality of received signals, an identification information of the signal transmitting device that sends each received signal is determined. Whether the signal transmitting device is a position identification module for position identification is detected according to the identification information of each signal transmitting device. A plurality of detected signal transmitting devices belonging to the position identification module are determined as a plurality of candidate signal transmitting devices.

For example, the mobile phone of the user is carried by the user. When the user holds the intelligent display screen, the intelligent display screen must receive the received signal sent by the mobile phone. Therefore, for the intelligent display screen, the signal sent by the mobile phone should be considered as an interference signal. At this time, the signal transmitting device belonging to the position recognition module needs to be determined from the preset signal transmitting device list, thereby avoiding the interference of other signal transmitting devices.

The list of signal transmitting devices includes identification information (unique number) of the position identification module, position information of the module, and the like.

In an alternative embodiment, the target area to which the target signal transmitting device belongs is determined by the following steps: determining a coordinate position of the target signal transmitting device in an indoor coordinate system from a preset signal transmitting device list based on the identification information of the target signal transmitting device; determining a division area taking the coordinate position as a circle center and taking a preset length as a radius; and determining the division area as a target area to which the target signal transmitting device belongs in the indoor coordinate system.

In this step, after the identification information of the target signal transmitting device is determined, a coordinate position of the target signal transmitting device in a pre-established indoor coordinate system is determined from a preset signal transmitting device list; and the coordinate position is taken as a circle center, a preset length is taken as a radius, a division area is determined, and the division area is determined as a target area.

Here, for the establishment of the indoor coordinate system, a three-dimensional coordinate system can be established. For example, the intelligent display screen is required to display an indoor scene of a user, and the central point of the living room of the user may be used as an origin of the coordinate system. Two directions perpendicular to each other are an X axis and a Y axis, respectively. A direction perpendicular to the ground of the living room is a Z axis. A distance in the room is 1:10 meters of the indoor coordinate system and the coordinate position of the intelligent device in the indoor coordinate system.

Here, in order to prevent one coordinate position from covering a preset position node in the corresponding scene, or the coordinate position is just located between the two scenes, a target area can be determined according to the coordinate position, and a corresponding scene is determined according to the target area.

The preset length can be determined according to the correspondence between the coordinate position in the indoor coordinate system and the indoor scene (the scale relationship) according to the coordinate position in the indoor coordinate system and the indoor scene.

Here, the preset length and the indoor coordinate system can be determined and established when the intelligent display screen is used for the first time.

In an alternative embodiment, the target scene corresponding to the target area in a layout diagram of the intelligent display screen is determined by the following steps: determining at least one preset position node in the target area based on the coordinate position and a plurality of coordinate positions in the indoor coordinate system in the target area; and determining the target scene based on a mapping relationship between each preset position node and a scene in the layout diagram.

In this step, at least one preset position node in the target scene covered by the target area is determined according to the coordinate position of the target signal transmitting device in the preset indoor coordinate system and a plurality of coordinate positions of the target area in the indoor coordinate system covered in the indoor coordinate system, and the target scene is determined based on the mapping relationship between each preset position node and the scene in the layout map.

Here, in the layout diagram generation process, each scene in the layout diagram corresponds to a plurality of preset position nodes, and each preset position node corresponds to a coordinate position in an indoor coordinate system. The target scene can be determined by at least one preset position node covered by the target area and a mapping relationship between the preset position node and the target scene.

Here, more than one indoor scenes may be covered in the target area, and the target scene may be determined according to the quantity of preset position nodes in each covered scene, and the indoor scene including the preset number of preset position nodes is determined as the target scene.

The preset position node may be a virtual node set in a design process of the layout diagram.

According to the method for changing a displayed scene provided in this example of the present disclosure, a plurality of candidate signal transmitting devices and a distance between each candidate signal transmitting device and the intelligent display screen are determined based on a plurality of received received signals; a target signal transmitting device closest to the intelligent display screen is determined from a plurality of candidate signal transmitting devices, and a target area to which the target signal transmitting device belongs is determined; a target scene corresponding to the target area in a layout diagram displayed by the intelligent display screen is determined, and a displayed scene of the intelligent display screen is changed to the target scene; a device recommendation information corresponding to the target scene is determined; and a plurality of intelligent devices in the target scene are determined based on the device recommendation information and each intelligent device and the corresponding work information are displayed on the intelligent display screen; and the work information selected by a user based on the received control instruction of the user is determined, and the corresponding intelligent device is controlled to work.

Compared with the method for changing a scene in the prior art, the target signal transmitting device closest to the intelligent display screen is determined from a plurality of candidate signal transmitting devices through a plurality of received receiving devices, and the corresponding target scene in a layout map is determined based on the target area to which the target signal transmitting device belongs. Therefore, the displayed scene of the intelligent display screen can be automatically changed to the target scene in real time, and the efficiency and effectiveness of switching the displayed scene of the intelligent display screen can be improved.

Figure 4:
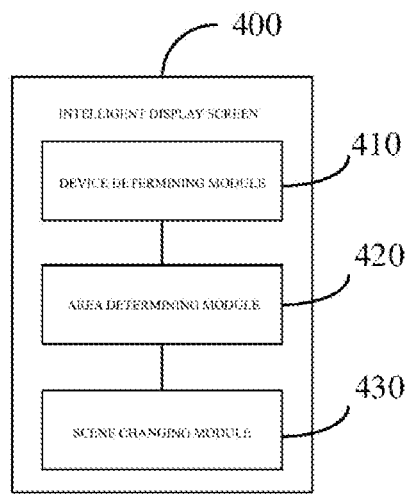
FIG. 4 is a first schematic structural diagram of an intelligent display screen according to an embodiment of the present disclosure.
Figure 5:
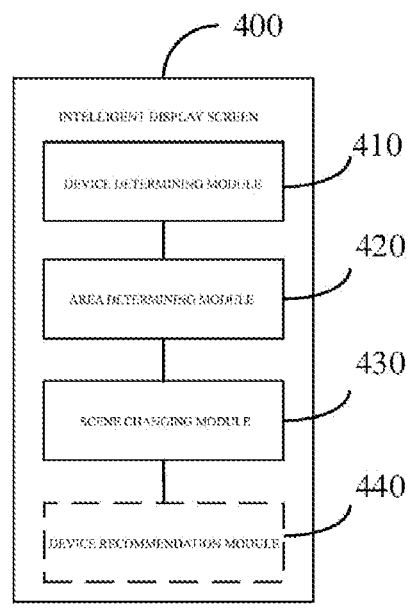
FIG. 5 is a second schematic structural diagram of an intelligent display screen according to an example of the present disclosure.

Referring to FIG. 4 and FIG. 5, FIG. 4 is a schematic structural diagram of an intelligent display screen according to an example of the present disclosure. FIG. 5 is a second schematic structural diagram of an intelligent display screen according to an example of the present disclosure. As shown in FIG. 4, the intelligent display screen 400 comprises:

a device determining module 410, configured to determine a plurality of candidate signal transmitting devices and a distance between each candidate signal transmitting device and the intelligent display screen based on a plurality of received received signals;

an area determining module 420, configured to determine a target signal transmitting device closest to the intelligent display screen from a plurality of candidate signal transmitting devices and a target region to which the target signal transmitting device belongs; and a scene changing module 430, configured to determine a target scene corresponding to the target area in a layout diagram displayed by the intelligent display screen, and change the displayed scene of the intelligent display screen to the target scene.

In an alternative embodiment, as shown in FIG. 5, the intelligent display screen 400 further comprises a device recommendation module 440, configured to:

determine a device recommendation information corresponding to the target scene;

determine a plurality of intelligent devices in the target scene based on the device recommendation information, and display each intelligent device and the corresponding work information on the intelligent display screen; and determine a work information selected by a user based on the received control instruction of the user, and control the corresponding intelligent device to work.

In an alternative embodiment, the device determining module 410 is configured to determine the candidate signal transmitting device by the following steps:

determining an identification information of a signal transmitting device corresponding to each received received signal, and detecting whether the corresponding signal transmitting device belongs to a position identification device based on the identification information of each signal transmitting device;

determining the signal transmitting device belonging to the position identification device as a candidate signal transmitting device.

In an alternative embodiment, the area determining module 420 is configured to determine a target area to which the target signal transmitting device belongs by the following steps:

determining a coordinate position of the target signal transmitting device in an indoor coordinate system from a preset signal transmitting device list based on the identification information of the target signal transmitting device;

determining a division area taking the coordinate position as a circle center and taking a preset length as a radius; and determining the division area as a target region to which the target signal transmitting device belongs in the indoor coordinate system.

In an alternative area, the scene changing module 430 is configured to determine a target scene corresponding to the target area in a layout diagram of the intelligent display screen by the following steps:

determining at least one preset position node in the target area based on the coordinate position and a plurality of coordinate positions in the indoor coordinate system in the target area; and determining the target scene based on a mapping relationship between each preset position node and a scene in the layout diagram.

According to the intelligent display screen provided in examples of the present disclosure, a plurality of candidate signal transmitting devices and a distance between each candidate signal transmitting device and the intelligent display screen are determined based on a plurality of received received signals; a target signal transmitting device closest to the intelligent display screen from the plurality of candidate signal transmitting devices and a target area to which the target signal transmitting device belongs are determined; and a target scene corresponding to the target area in a layout diagram displayed by the intelligent display screen is determined, and the displayed scene of the intelligent display screen is changed to the target scene.

Compared with the method for changing a scene in the prior art, the target signal transmitting device closest to the intelligent display screen is determined from a plurality of candidate signal transmitting devices through a plurality of received receiving devices, and the corresponding target scene in a layout map is determined based on the target area to which the target signal transmitting device belongs. Therefore, the displayed scene of the intelligent display screen can be automatically changed to the target scene in real time, and the efficiency and effectiveness of changing the displayed scene of the intelligent display screen can be improved.

Figure 6:
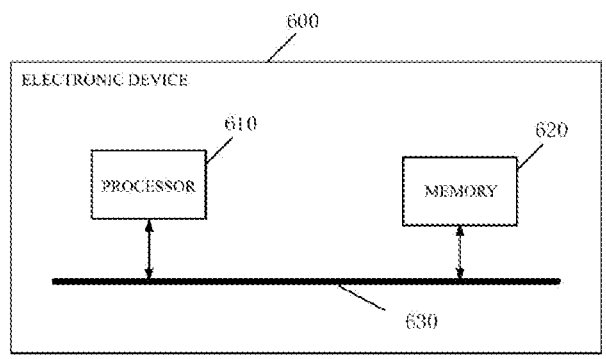
FIG. 6 is a schematic structural diagram of an electronic device according to an example of the present disclosure.

Referring to FIG. 6, FIG. 6 is a schematic structural diagram of an electronic device according to an example of the present disclosure. As shown in FIG. 6, the electronic device 600 comprises a processor 610, a memory 620 and a bus 630.

The memory 620 stores machine-readable instructions executable by the processor 610. When the electronic device 600 runs, the processor 610 communicates with the memory 620 through the bus 630. When the machine-readable instructions are executed by the processor 610, the method for changing a displayed scene in the method examples shown in FIG. 2 and FIG. 3 can be carried out. For a specific implementation, reference can be made to the method examples. Therefore, details are not described herein again.

An example of the present disclosure further provides a computer-readable storage medium. The computer-readable storage medium stores a computer program. When the computer program is run by a processor, the method for changing a displayed scene in the method examples shown in FIG. 2 and FIG. 3 can be carried out. For a specific implementation, reference can be made to the method examples. Therefore, details are not described herein again.

It can be clearly understood by one skilled in the art that, for the purpose of convenient and brief description, for a detailed working process of the foregoing system, apparatus, and unit, reference can be made to a corresponding process in the foregoing method examples. Therefore, details are not described herein again.

In the several examples provided in the present disclosure, it should be understood that the disclosed system, device, and method can be implemented in other manners. The device examples described above are merely illustrative. For example, the division of the units is merely a logical function division and can be other divisions in actual implementation. For another example, a plurality of units or components can be combined or integrated into another system, or some features may be ignored or not performed. Moreover, the displayed or discussed mutual coupling or direct coupling or communication connection may be implemented through some communication interfaces. The indirect coupling or communication connection among devices or units may be implemented in electrical, mechanical, or other forms.

The units described as separate parts may or may not be physically separate. Parts displayed as units may or may not be physical units, i.e. may be located in one position, or may be distributed in a plurality of network units. Some or all of the units may be selected according to actual needs to achieve the objectives of the solutions of the present disclosure.

Furthermore, functional units in the examples of the present disclosure may be integrated into one processing unit, or each of the units may exist alone physically, or two or more units are integrated into one unit. When function is carried out in the form of a software functional unit and sold or used as an independent product, the function may be stored in a non-volatile computer-readable storage medium executable by a processor. Based on such an understanding, the technical solutions of the present disclosure essentially, or a part contributing to the prior art, or a part of the technical solution may be embodied in the form of a software product. The computer software product is stored in a storage medium and includes several instructions for instructing a computer device (which may be a personal computer, a server, or a network device) to perform all or part of the methods described in the examples of the present disclosure. The foregoing storage medium includes any medium that can store program codes, such as a USB flash drive, a removable hard disk, a read-only memory (ROM), a random access memory (RAM), a magnetic disk, or an optical disc.

Finally, it should be noted the examples described above are only specific embodiments of the present disclosure to describe the technical solutions of the present disclosure, but not to limit the technical solutions of the present disclosure. The protection scope of the present disclosure is not limited thereto. Although the present disclosure is described in detail with reference to the foregoing examples, one skilled in the art should understand that one skilled in the art may still make modifications to the technical solutions described in the foregoing examples or make equivalent replacements to some of the technical features within the technical scope disclosed in the present disclosure. These modifications, changes or replacements do not make the essence of the corresponding technical solutions depart from the spirit and scope of the technical solutions of the examples in the present disclosure, and all shall fall within the protection scope of the present disclosure. Therefore, the protection scope of the present disclosure shall be subject to the protection scope of the claims.

INDUSTRIAL APPLICABILITY

The method for changing a displayed scene provided in the present disclosure, comprising determining a plurality of candidate signal transmitting devices and a distance between each candidate signal transmitting device and an intelligent display screen based on a plurality of received received signals, determining a target signal transmitting device closest to the intelligent display screen from a plurality of candidate signal transmitting devices and a target area to which the target signal transmitting device belongs; and determining a target scene corresponding to the target area in a layout diagram displayed by the intelligent display screen, and changing the displayed scene of the intelligent display screen to the target scene.

What is claimed is:

1. A method for changing a displayed scene applied to an intelligent display screen, comprising:
   determining a plurality of candidate signal transmitting devices and a distance between each candidate signal transmitting device and the intelligent display screen based on a plurality of received signals;
   determining a target signal transmitting device closest to the intelligent display screen from a plurality of candidate signal transmitting devices and a target area to which the target signal transmitting device belongs; and
   determining a target scene corresponding to the target area in a layout diagram displayed by the intelligent display screen and changing the displayed scene of the intelligent display screen to the target scene;
   determining a device recommendation information corresponding to the target scene;
   determining a plurality of intelligent devices in the target scene based on the device recommendation information, and displaying each intelligent device and corresponding work information on the intelligent display screen; and
   determining work information selected by a user based on received control instruction of the user, and controlling the corresponding intelligent device to work.

2. The method of claim 1, wherein the candidate signal transmitting device is determined by the following steps:
   determining an identification information of a signal transmitting device corresponding to each received signal, and detecting whether the corresponding signal transmitting device belongs to a position identification device based on the identification information of each signal transmitting device; and
   determining the signal transmitting device belonging to the position identification device as the candidate signal transmitting device.

3. The method of claim 1, wherein the target area to which the target signal transmitting device belongs is determined by the following steps:
   determining a coordinate position of the target signal transmitting device in an indoor coordinate system from a preset signal transmitting device list based on the identification information of the target signal transmitting device;
   determining a division area taking the coordinate position as a circle center and taking a preset length as a radius; and
   determining the division area as the target area to which the target signal transmitting device belongs in the indoor coordinate system.

4. The method of claim 3, wherein the target scene corresponding to the target area in the layout diagram of the intelligent display screen is determined by the following steps:
   determining at least one preset position node in the target area based on the coordinate position and a plurality of the coordinate positions in the indoor coordinate system in the target area; and
   determining the target scene based on a mapping relationship between each preset position node and a scene in the layout diagram.

5. The method of claim 1, wherein the determining a plurality of candidate signal transmitting devices and a distance between each candidate signal transmitting device and the intelligent display screen based on a plurality of received signals comprises:
   determining a candidate signal transmitting device emitting each received signal based on the received signal; and
   determining a distance between each candidate signal transmitting device and the intelligent display screen receiving the received signal.

6. The method of claim 5, wherein the determining a distance between each candidate signal transmitting device and the intelligent display screen receiving the received signal comprises:
   determining strength of the received signal; and
   determining a distance between each candidate signal transmitting device and the intelligent display screen receiving the received signal based on the strength of the received signal.

7. The method of claim 5, wherein the determining a distance between each candidate signal transmitting device and the intelligent display screen receiving the received signal comprises:
   sending a signal instruction to the first candidate signal transmitting device at a receiving time point of the received signal, wherein the first candidate signal transmitting device is any one of a plurality of candidate signal transmitting devices; and
   determining a distance between the first candidate signal transmitting device and the intelligent display screen receiving the received signal by receiving a time of a feedback signal fed back by the first candidate signal transmitting device.

8. An electronic device, comprising: a processor, a memory and a bus, wherein the memory stores machine-readable instructions executable by the processor, and when the electronic device runs, the processor communicates with the memory through the bus, and when the machine-readable instructions are executed by the processor, the method for changing a displayed scene of claim 1 is carried out.

9. A computer readable storage medium, wherein a computer program is stored on the computer readable storage medium, and when the computer program is run by a processor, the method for changing a displayed scene of claim 1 is carried out.

* * * * *